United States Patent
Yang et al.

[11] Patent Number: 5,485,333
[45] Date of Patent: Jan. 16, 1996

[54] SHORTED DMR REPRODUCE HEAD

[75] Inventors: Danny D. L. Yang, San Diego; Jay D. Freeman, Leucadia, both of Calif.

[73] Assignee: Eastman Kodak Company, Rochester, N.Y.

[21] Appl. No.: 52,447

[22] Filed: Apr. 23, 1993

[51] Int. Cl.⁶ .................................................. G11B 5/39
[52] U.S. Cl. .................................................. 360/113
[58] Field of Search .................. 360/113; 338/32 R; 324/252; 365/157, 158

[56] References Cited

U.S. PATENT DOCUMENTS

| | | | |
|---|---|---|---|
| 4,209,552 | 6/1980 | Welch | 427/78 |
| 4,528,121 | 7/1985 | Matsushita et al. | 252/516 |
| 4,686,472 | 8/1987 | Van Ooijen et al. | 324/252 |
| 4,876,119 | 10/1989 | Takeda et al. | 427/250 |
| 4,896,235 | 1/1990 | Takino et al. | 360/113 |
| 5,066,513 | 11/1991 | Zurecki et al. | 427/37 |
| 5,068,072 | 11/1991 | Horinouchi et al. | 264/66 |
| 5,068,211 | 11/1991 | Giunchi et al. | 501/98 |
| 5,084,794 | 1/1992 | Smith | 360/113 |
| 5,114,743 | 5/1992 | Weber | 427/77 |
| 5,164,246 | 11/1992 | Tanaka et al. | 428/209 |
| 5,192,618 | 3/1993 | Frankel et al. | 360/113 |
| 5,193,038 | 3/1993 | Smith | 360/113 |
| 5,258,884 | 11/1993 | Howard et al. | 360/113 |
| 5,304,975 | 4/1994 | Saito et al. | 360/113 |

FOREIGN PATENT DOCUMENTS

| | | |
|---|---|---|
| 0007115 | 1/1980 | European Pat. Off. . |
| 52-11202 | 5/1975 | Japan . |
| 1208714 | 8/1989 | Japan . |
| 2-271628 | 11/1990 | Japan . |
| 366012 | 3/1991 | Japan . |

OTHER PUBLICATIONS

R. L. O'Day, Balanced Magnetic Head, Feb. 1973 vol. 15, No. 9.

*Primary Examiner*—John H. Wolff
*Assistant Examiner*—David D. Davis
*Attorney, Agent, or Firm*—William F. Noval

[57] ABSTRACT

A shorted DMR reproduce head includes two substantially identical MR elements, separated by a thin film of titanium nitride having a resistivity of 1000 $\mu\Omega$-cm. Signal loss due to current shunting in the shorted DMR head is significantly reduced by use of the titanium nitride film.

5 Claims, 5 Drawing Sheets

SHORTED DMR REPRODUCE HEAD

FIELD OF THE INVENTION

This invention relates to a magnetoresistive reproduce head and in particular to a shorted dual element magnetoresistive (DMR) head.

BACKGROUND OF THE INVENTION

A shorted DMR reproduce head for reproducing signals recorded in a magnetic recording medium is disclosed in U.S. Pat. No. 5,193,038 issued Mar. 9, 1993 to Smith. The shorted DMR head includes a pair of identical magnetoresistive (MR) stripes separated by a non-magnetic conductive spacer. Sputtered titanium has been employed as the conductive spacer material. The resistivity of sputtered titanium is about 100 $\mu\Omega$-cm and the resulting shorted DMR reproduce head suffers from a roughly 40% signal loss due to current shunting in the head. The problem to be solved by the present invention is to provide a shorted DMR reproduce head with reduced signal loss.

SUMMARY OF THE INVENTION

The problem is solved according to the present invention by providing a shorted DMR reproduce head wherein the spacer between the magnetoresistive stripes is a layer of titanium nitride having a resistivity value of between 200 $\mu\Omega$-cm and 2,000 $\mu\Omega$-cm. The titanium nitride is a high melting point metallic compound with high thermal and electrical conductivity and low grain boundary and bulk diffusivity. Generally, the resistivity of stoichiometric titanium nitride film is lower than that of pure titanium films. However, we have discovered that deposited titanium nitride films can have a wide range of resistivity values depending on the deposition conditions. Particularly, when depositing titanium nitride films by reactive sputtering, increasing the nitrogen gas flow or reducing the deposition rate by lowering the sputtering power, in the presence of some ambient oxygen, results in higher resistivity titanium nitride films. By controlling the deposition conditions of the titanium nitride films to produce a film having resistivity between 200 $\mu\Omega$-cm and 2,000 $\mu\Omega$-cm and preferably 1,000 $\mu\Omega$-cm, the signal loss due to current shunting in the resulting shorted DMR may be reduced to less than 5%. In addition, the titanium nitride layer is easy to prepare and can be deposited in sequence with the MR elements in the same sputtering chamber.

DETAILED DESCRIPTION OF THE INVENTION

Figure 1:
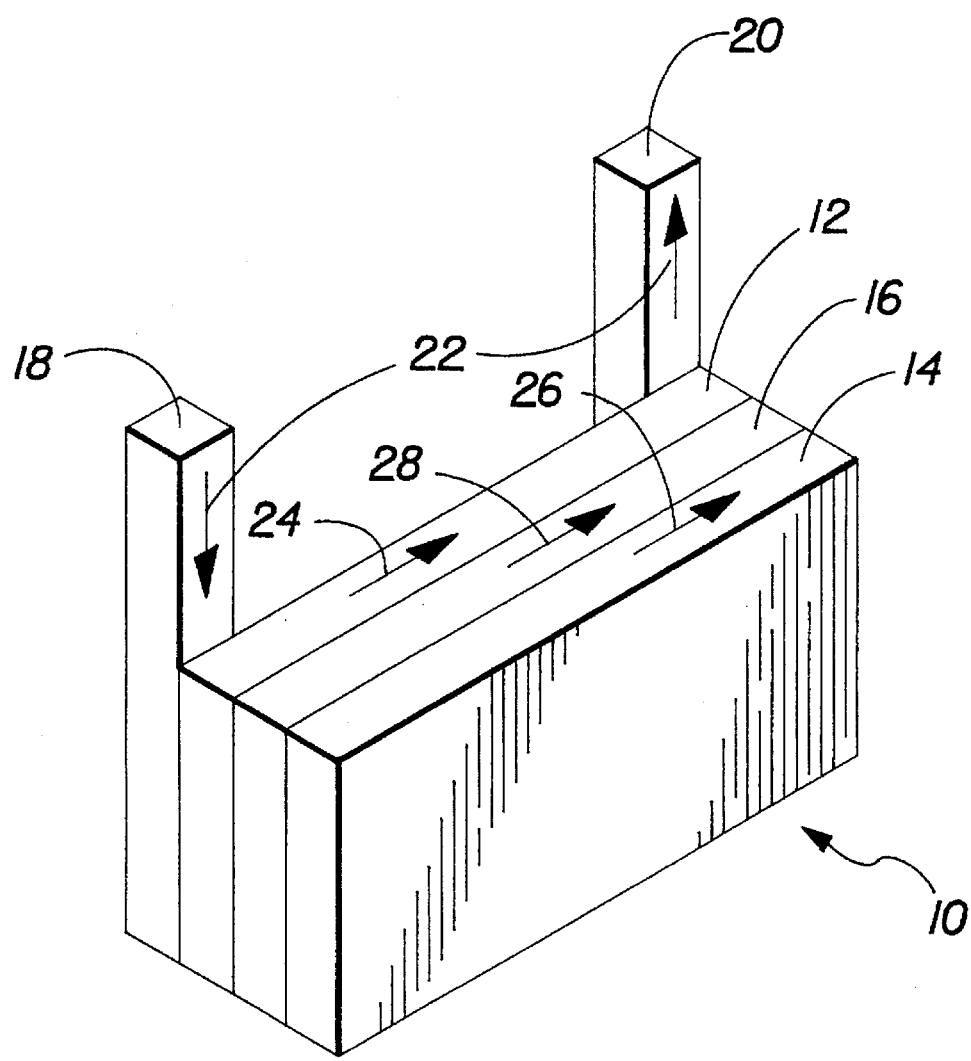
FIG. 1 is a schematic perspective view of a shorted DMR reproduce head according to the present invention.

Referring to FIG. 1, a shorted DMR reproduce head 10 according to the present invention, includes a pair of sensing and mutually biasing magnetoresistive (MR) elements 12, 14 matched for magnetoresistive characteristics, electrical resistivity, and geometrical shape and dimensions. The MR elements 12, 14 are separated by an electrically conductive, non-magnetic layer 16 of titanium nitride having a resistivity of between 200 $\mu\Omega$-cm to 2,000 $\mu\Omega$-cm. A current 22 which is the sense current and the excitation current for biasing the MR elements 12, 14 flows into two leads 18, 20 connected to the shorted DMR head.

The MR elements 12, 14 are in electrical contact over their entire length with the titanium nitride layer 16 and will therefor share any current flowing in the DMR depending on the relative resistances of the MR elements and the titanium nitride layer. Because the MR elements 12, 14 are matched for electrical characteristics (as well as magnetic characteristics) and because of the symmetry of the DMR head, the current will divide into current components 24, 26, 28 where the currents 24, 26 flowing in the same direction through the MR elements 12, 14 are equal in magnitude and the remainder of the current, i.e. current 28, flows in the spacer 16.

Figure 2:
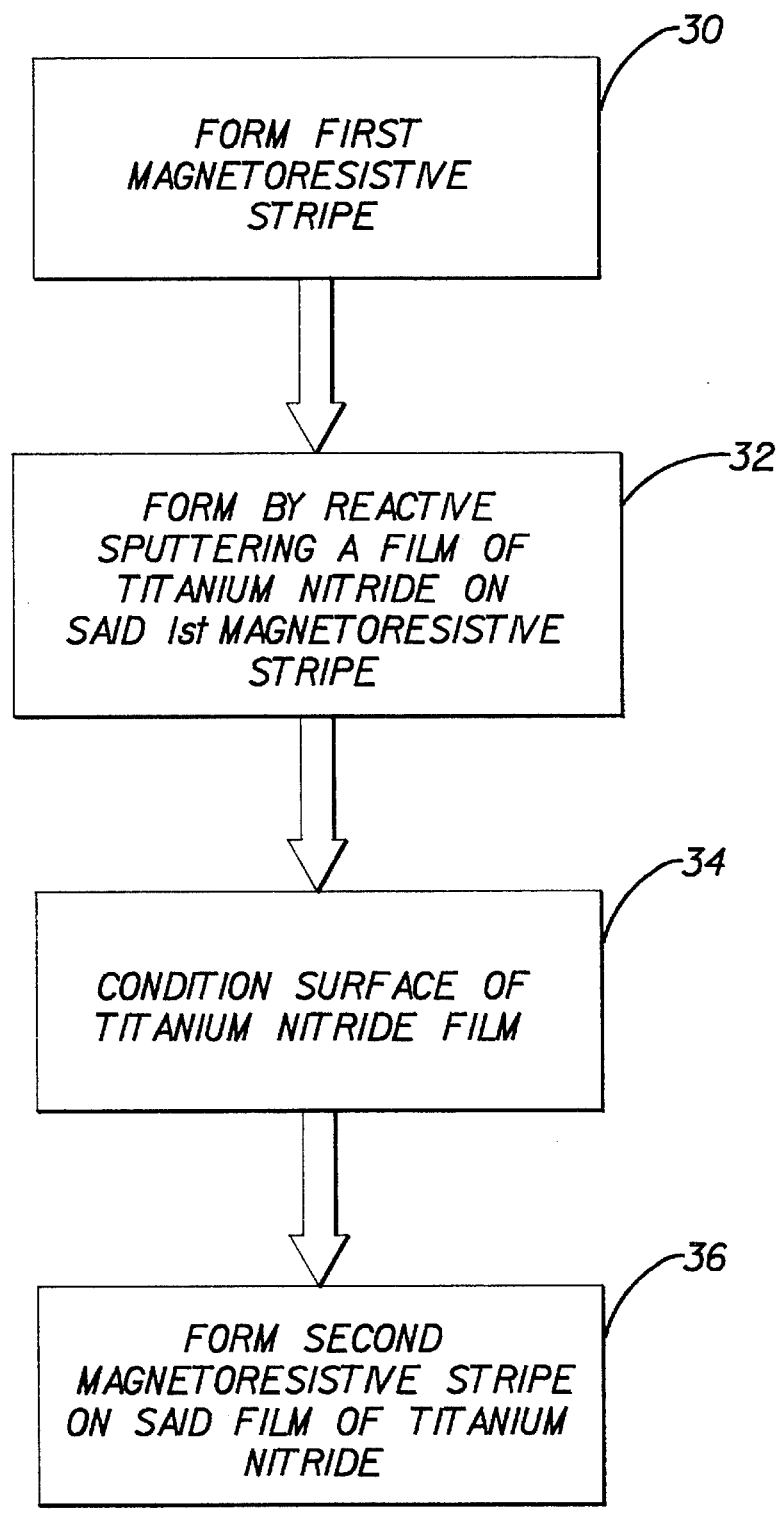
FIG. 2 is a flow chart showing the steps of making a shorted DMR head according to the present invention.
Figure 3:
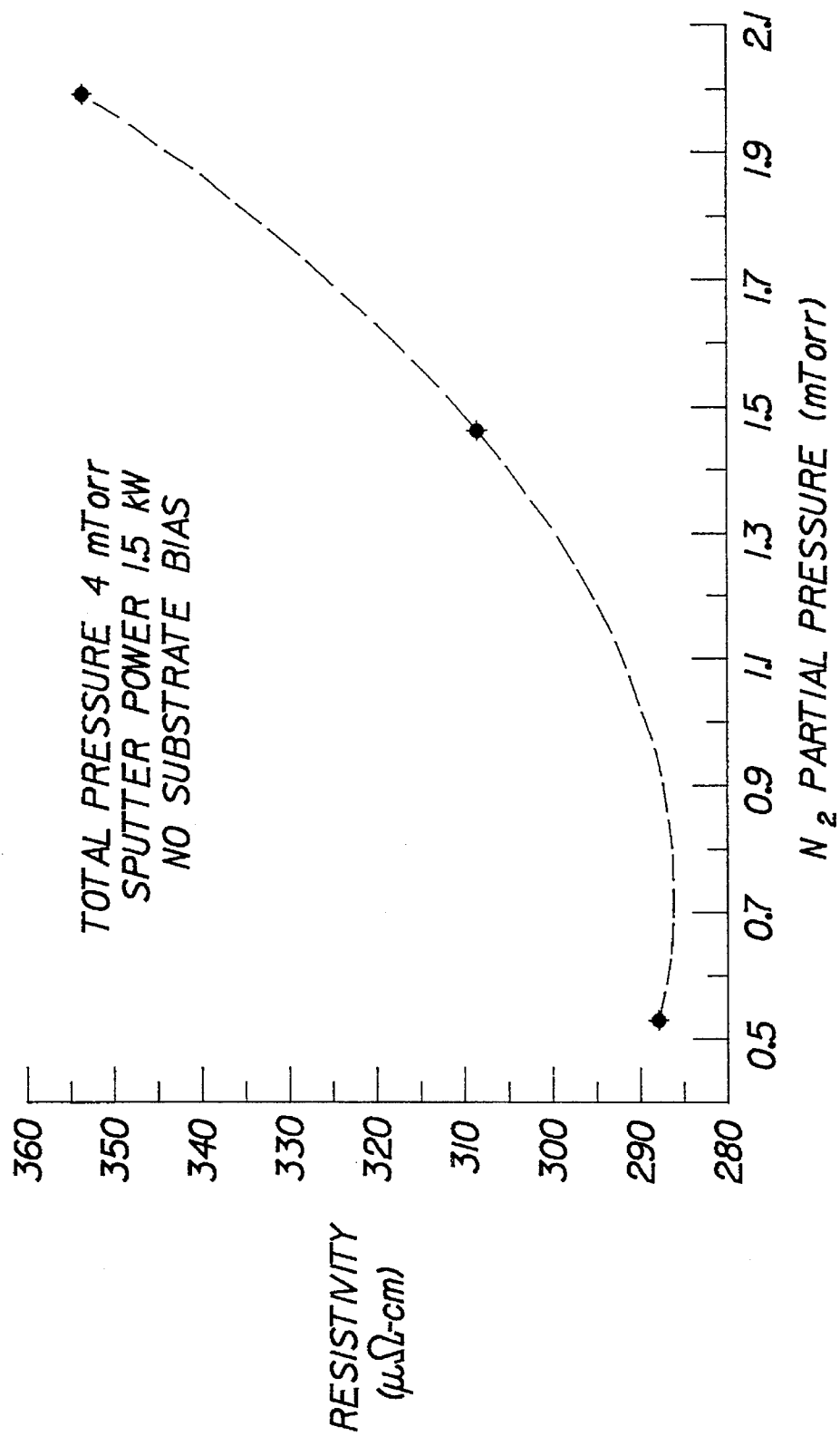
FIG. 3 is a graph showing the resistivity of titanium nitride film vs. nitrogen partial pressure during sputtering.
Figure 4:
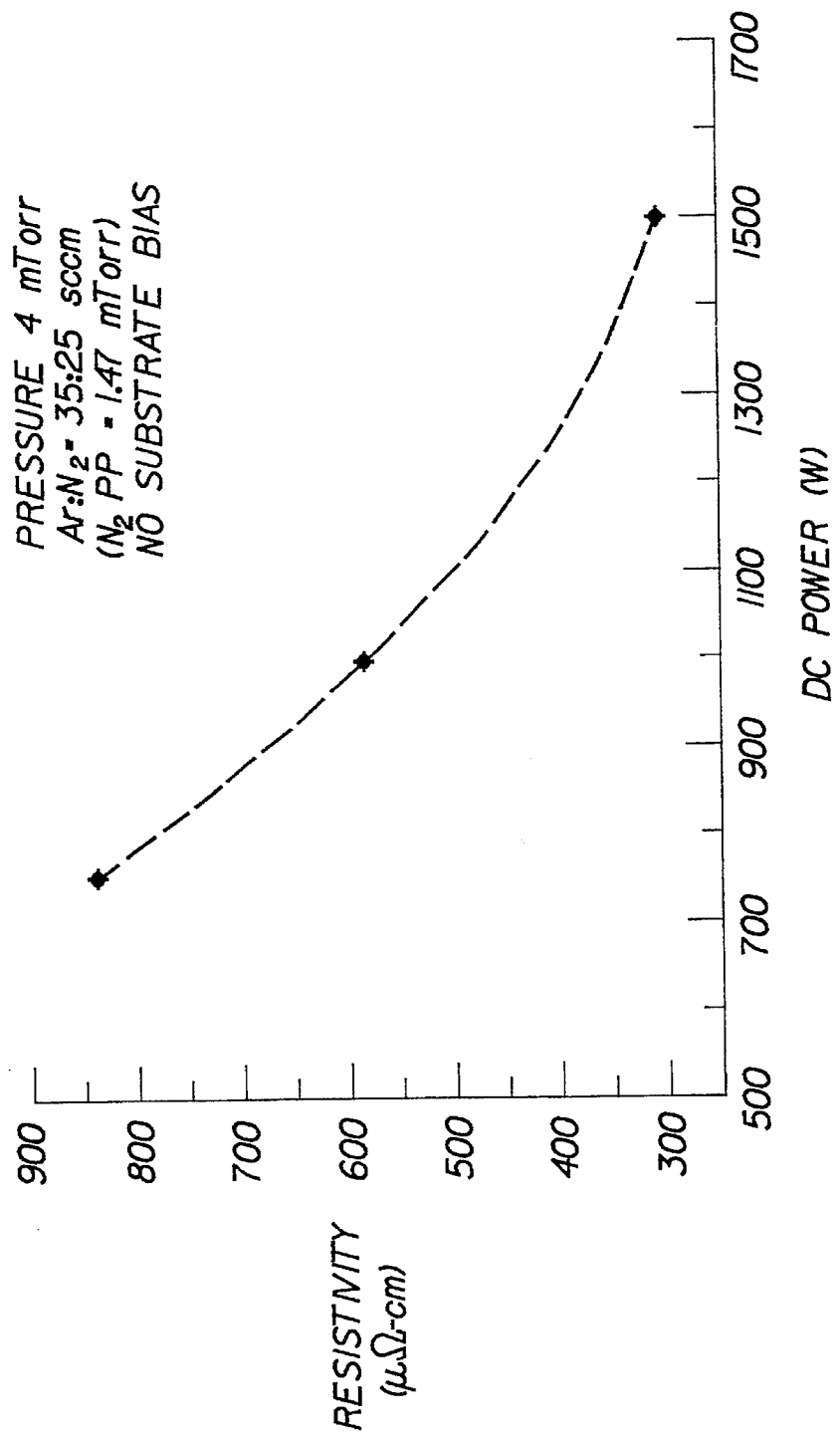
FIG. 4 is a graph showing the resistivity of titanium nitride film vs. the DC power employed in the sputtering apparatus.

Turning now to FIG. 2, the shorted DMR reproduce head according to the present invention is produced as follows. The first MR element 12 is formed (30) for example by sputtering 250Å of permalloy under conditions well known in the art for forming MR elements. Next the film 16 of titanium nitride is deposited (32) over the first MR element 12. FIG. 3 is a plot of empirical data showing the resistivity of the deposited film as a function of partial pressure of nitrogen and FIG. 4 is a plot of empirical data showing the resistivity of the titanium nitride as a function of sputtering power. In a preferred embodiment, titanium nitride is sputtered at a temperature of 120° C. using a pure titanium target at a sputtering pressure of 4 m Torr with an argon:nitrogen gas flow ratio=60:40. Not all of the ambient atmosphere is purged from the sputtering chamber so that sufficient oxygen remains in the chamber to contribute a small atomic percentage (e.g., 3–12 atomic percent) of oxygen to the resulting titanium nitride layer. The titanium nitride layer was deposited at approximately 0.6Å/second with an applied DC power of 700 W to a thickness of 1,000Å. The measured resistivity of the deposited titanium nitride film was 1,000 $\mu\Omega$-cm. This high film resistivity was mainly attributed to the low deposition rate which resulted in a microstructure that accommodated a significant amount of trapped oxygen.

Figure 5:
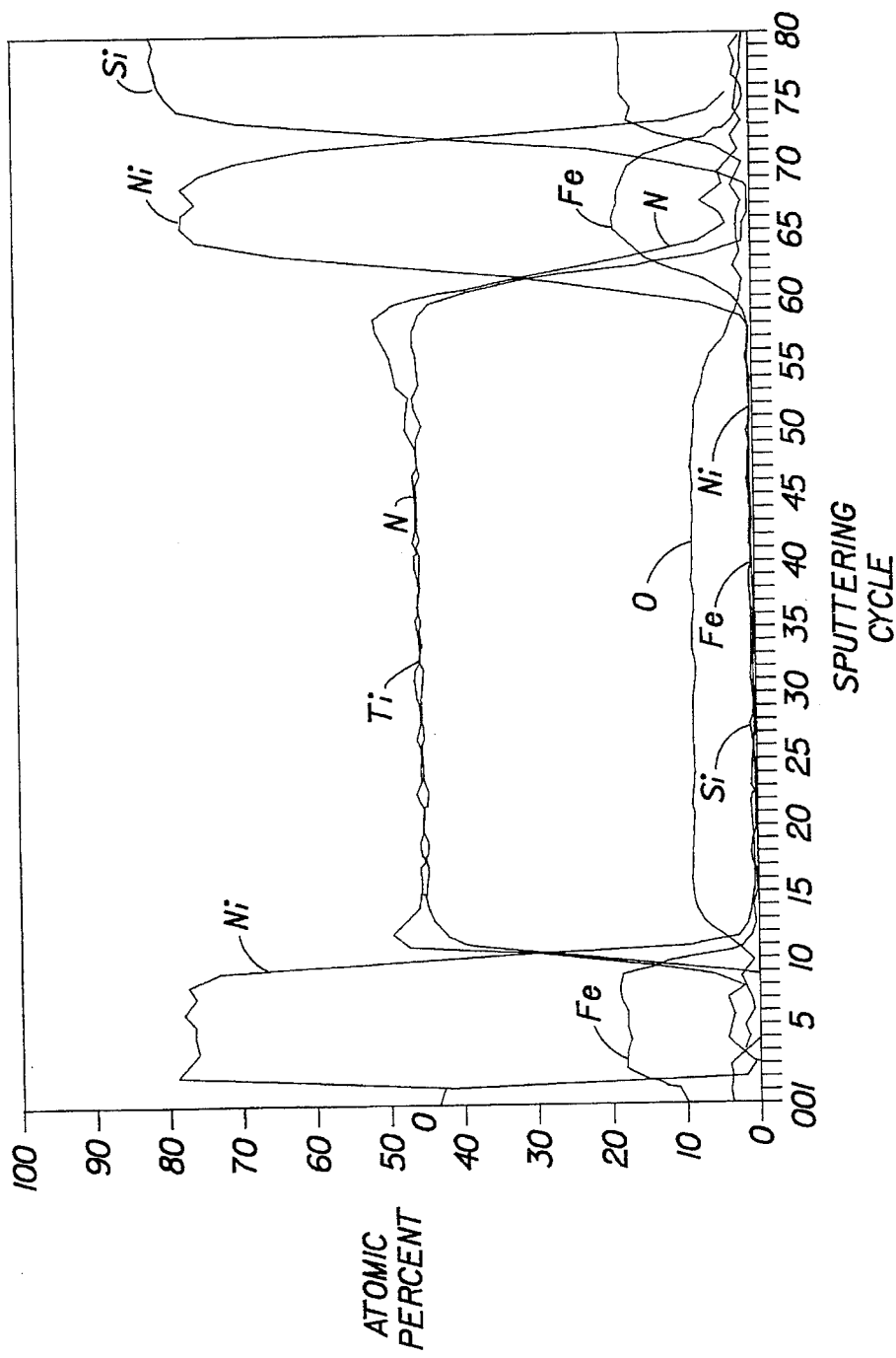
FIG. 5 is an Auger spectrometer profile of a titanium nitride film prepared according to the present invention, showing the presence of a few percent of oxygen in the film.

FIG. 5 is a plot of an Auger analysis of the finished DMR structure, showing about 7% trapped oxygen in the titanium nitride layer.

After the titanium nitride layer 16 is deposited, the surface of the titanium nitride layer is conditioned (34) to remove the columnar structure of the titanium nitride film, which if left untreated would adversely affect the properties of the magnetoresistive element 14. A preferred method of conditioning the surface of the titanium nitride layer 16 is to sputter etch or ion-mill the deposited titanium nitride layer to remove about 200Å from the surface thereof. Finally, the second MR element 14 is formed (36) on top of the titanium nitride film under the same conditions that were employed for forming the first MR element 12.

Measured DMR properties for a shorted DMR reproduce head prepared as described above were as follows: Hk=4.03 Oe; Hch=0.565 Oe; Hce=0.481 Oe; Rs=5.094 $\Omega/\square$ and $\delta\rho/\rho$=2.10%. Where:

Hk is anisotropy field;

Hch is hard axis coercivity;

Hce is easy axis coercivity;

Rs is sheet resistance; and $\delta\rho/\rho$ is magnetoresistance coefficient.

The signal loss due to current shunting in the resulting shorted DMR head was less than 5%. To determine the stability of the titanium nitride spacer material, the DMR head structure was subjected to anneal at 275° C. for twenty hours in air. The annealing resulted in only a minor change in film properties that did not degrade the performance of the shorted DMR head.

While the invention has been particularly shown and described with reference to a preferred embodiment thereof, it will be understood by those skilled in the art that various other changes in the form and details may be made therein without departing from the spirit and scope of the invention.

PARTS LIST

10 Shorted DMR head
12 MR element
14 MR element
16 titanium nitride spacer
18 lead
20 lead
24, 26, 28 currents

What is claimed is:

1. A shorted dual magnetoresistive (MR) reproduce head, comprising:

a. a pair of magnetoresistive elements;

b. a spacer consisting of titanium nitride having a resistivity value of between 200 $\mu\Omega$-cm and 2,000 $\mu\Omega$-cm between said magnetoresistive elements; and c. means for flowing electrical current in the same direction through said pair of MR elements and said spacer, wherein the current flowing through said spacer is substantially less than the electrical current flowing through said MR elements due to the much higher resistivity of said spacer than the resistivity of said MR elements, and wherein said signal loss of said reproduce head due to current shunting through said spacer is substantially reduced.

2. The shorted DMR reproduce head claimed in claim 1, wherein said titanium nitride spacer includes 3–12 atomic percent oxygen.

3. The shorted DMR reproduce head claimed in claim 1, wherein said titanium nitride spacer has a resistivity of 1,000 $\mu\Omega$-cm.

4. The shorted DMR reproduce head of claim 1 wherein said spacer of titanium nitride is formed by reactive sputtering a film of titanium nitride on one of said pair of magnetorestrictive stripes and said other of said pair of magnetorestrictive stripes is formed on said film of titanium nitride.

5. The shorted DMR reproduce head of claim 4 wherein the surface of said film of titanium nitride is sputter etched or ion milled prior to forming said other of said pair of magnetorestrictive stripes on said film of titanium nitride.

* * * * *